G. A. McGILL.
DRIVE GEAR FOR AUTOMOBILES.
APPLICATION FILED DEC. 28, 1912. RENEWED APR. 18, 1916.
1,186,409.
Patented June 6, 1916.
2 SHEETS—SHEET 2.
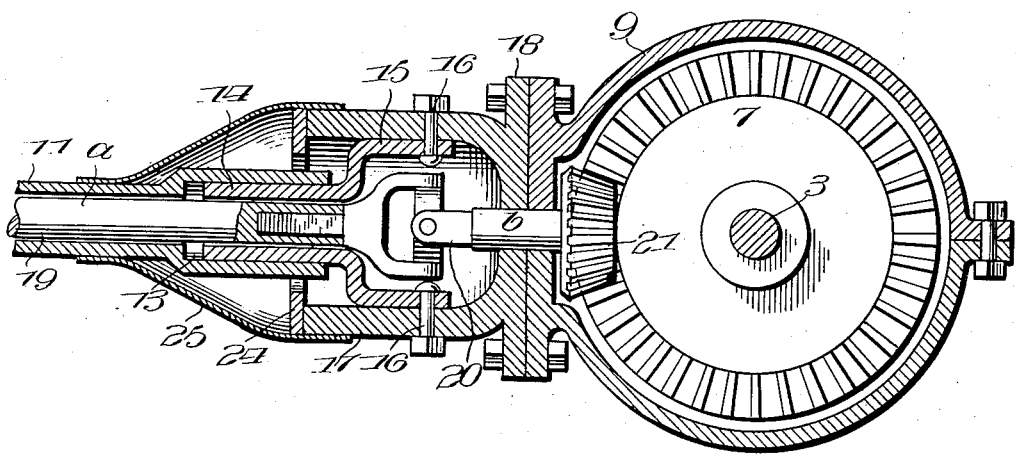
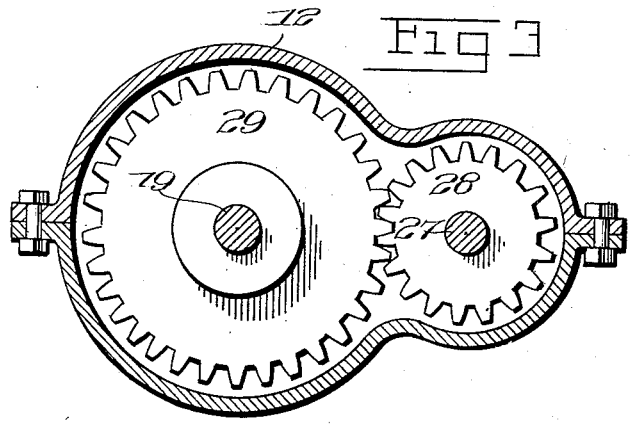
Inventor
George A. McGill
By Victor J. Evans
Attorney
Witnesses

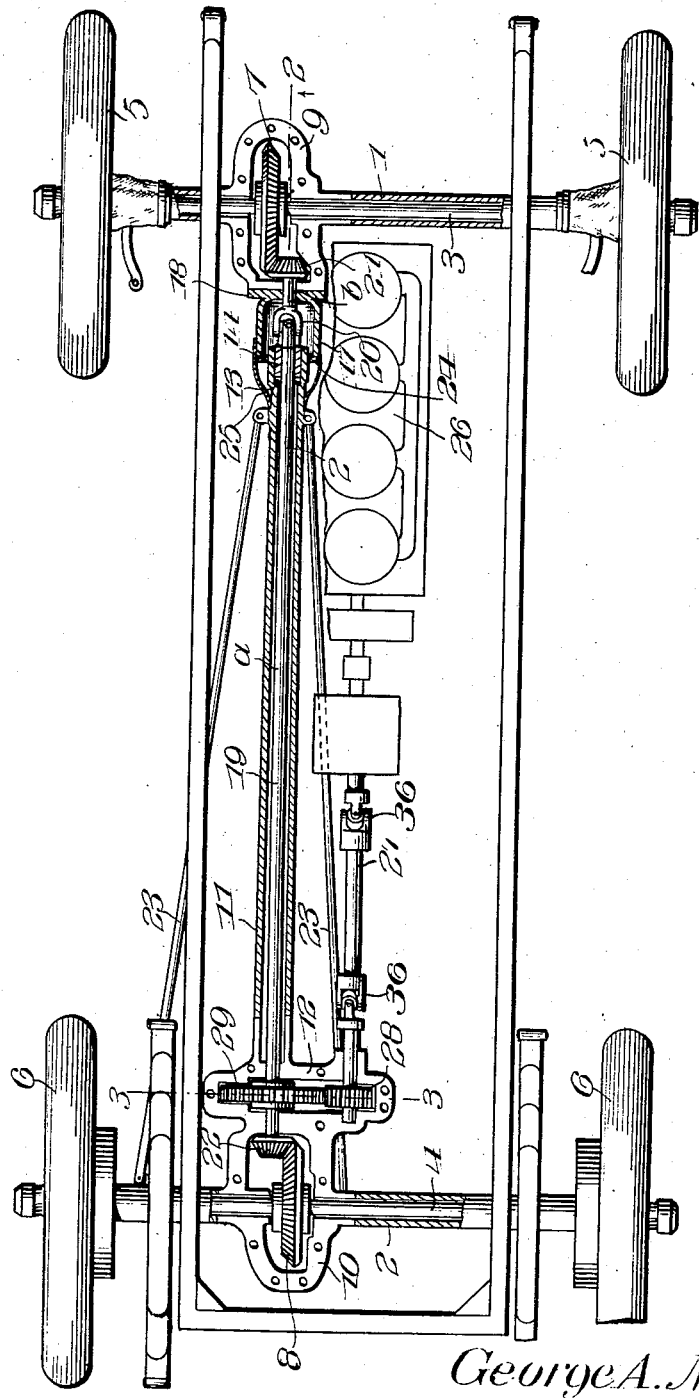

UNITED STATES PATENT OFFICE.

GEORGE A. McGILL, OF SHREVEPORT, LOUISIANA.

DRIVE-GEAR FOR AUTOMOBILES.

1,186,409. Specification of Letters Patent. Patented June 6, 1916.

Application filed December 28, 1912, Serial No. 739,111. Renewed April 18, 1916. Serial No. 92,025.

*To all whom it may concern:*

Be it known that I, GEORGE A. McGILL, a citizen of the United States, residing at Shreveport, in the parish of Caddo and State of Louisiana, have invented new and useful Improvements in Drive-Gear for Automobiles, of which the following is a specification.

This invention relates to motor vehicles, and it has particular reference to the running gear of the same.

One object of the invention is to provide a simple and improved construction whereby each of the four wheels will be positively driven by the motor.

A further object of the invention is to simplify and improve the construction and operation of the transmission means.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a top plan view, partly in section, of an automobile running gear constructed in accordance with the invention. Fig. 2 is a sectional detail view, enlarged, taken on the line 2—2 in Fig. 1. Fig. 3 is a sectional detail view, enlarged, taken on the line 3—3 in Fig. 1.

Corresponding parts in both figures of the drawings are denoted by like characters of reference.

The front and rear tubular axles or housings 1 and 2 contain the live shafts 3 and 4 carrying, respectively, the front steering wheels 5 and the rear wheels 6 which are operatively connected with said live shafts. Each of the shafts 3 and 4 carries a differential gearing 7, 8, the same being inclosed within casings 9, 10 on the tubular axles or housings.

Suitably associated with the casing 10 on the rear axle or housing 2 is the rear end of a tubular housing 11 which has an enlargement forming a casing 12 and which extends in a forward direction, the front end of said tubular housing being provided with a recess 13 for the reception of an extension member 14 which telescopes therein. The extension member 14 has a yoke 15 which is connected by vertically disposed pivot members 16 with a collar 17 on a cap member 18 that is suitably associated with the casing 9 inclosing the differential gearing 7.

Housed within the tubular member 11 is a shaft 19 which is composed of two members $a$, $b$ which are connected together by a universal joint 20 of the sliding type, the same being so constructed as to permit the shaft sections $a$ and $b$ to have a limited longitudinal movement independently of one another. The center of the universal joint 20 is disposed in alinement with the axes of the pivot members 16, which latter are in axial alinement with each other. The shaft 19 is provided at the ends thereof with bevel pinions 21, 22 meshing with bevel gears of the differential gearings 7 and 8, respectively. The tubular housing 11 is reinforced by means of brace rods 23. The collar 17 is provided with a flange plate or ring 24 surrounding the recessed portion of the tubular housing 11, but terminating at a slight distance therefrom to permit said housing such freedom of motion within the ring 24 as may be needed for successful operation. A dust and oil proof joint may be formed by a leather cap or hood 25 which is suitably connected with the ring 24.

The tubular housing 11 and related parts are disposed at one side of the longitudinal center of the running gear, and at one side of the motor 26, which latter occupies a central position and which has a driven shaft 27 extending within the casing 12 and having a pinion 28 meshing with a spur wheel of a differential gearing 29 on the shaft 19 which will thus be driven. The driven shaft 27 includes two universal joints 36 of the sliding type in order that allowance may be made for end thrust and also to avoid racking the parts when the car is traveling over rough roads.

In the operation of this device, it will be readily seen that motion is transmitted from the motor direct to the shaft 19 and from the latter equally direct to the front and rear axles, thus transmitting power to each of the four wheels. The arrangement of the differential gearings is such that not only may the live shafts 3 and 4 be operated at variable and unequal speed, but the speed of each of the four wheels may be different from that of the other three wheels, thus meeting conditions which are bound to occur more or less frequently and which, unless provided for, as shown by me, must necessarily result in uneven and undue wear, in loss of power, in loss of speed resultant of loss of power and in danger of injury to the parts of the machine. The transmission will thus be even, and the motion of the vehicle will be regular even if obstructions of different character and dimensions should be simultaneously encountered by the four wheels. Traffic over rough roads and other causes having a tendency to deflect the tubular axles from normal position with reference to one another and consequent distortion of the tubular housing 11 and the shaft 19 will be compensated for by the telescoping extension member 14 of the housing 11, by the pivotal connection of the yoke 15 with the collar 16, and by the universal joint 20, which will permit such deflection or distortion of the parts as is liable to occur under any circumstances.

The general construction is simple and effective. The motor may be mounted in a low position along the longitudinal center of the machine, as is highly desirable for the purpose of maintaining the center of gravity at a low point; and the transmission from the motor to the live shafts is simple and direct.

Having thus described the invention, what is claimed as new, is:—

1. In a four wheel drive for automobiles, tubular front and rear axles constituting housings for the wheel carrying shafts and having casings to accommodate differentials on said shafts, a tubular housing extending between said front and rear tubular axles, and a transmission shaft contained in said tubular housing, the said housing comprising a main tubular member having a recess at its front end, an extension member seated in said recess and having a yoke, a cap member secured on the differential casing of the tubular front axle, said cap member having a collar surrounding the yoke, and pivot members connecting the collar with the yoke.

2. In a four wheel drive for automobiles, tubular front and rear axles constituting housings for the wheel carrying shafts and having casings to accommodate differentials on said shafts, a tubular housing extending between said front and rear tubular axles, and a transmission shaft contained in said tubular housing, the said housing comprising a main tubular member having a recess at its front end, an extension member seated in said recess and having a yoke, a cap member secured on the differential casing of the tubular front axle, said cap member having a collar surrounding the yoke, pivot members connecting the collar with the yoke, a flange plate associated with the collar and loosely surrounding the end of the tubular main member of the housing, and a flexible hood connecting said tubular main member with the collar.

3. Gearing for motor vehicles including front and rear live shafts each including a differential gearing, tubular axles housing said shafts and having casings inclosing the differential gearings, a tubular housing connected with the casing of the rear axle and having an enlargement forming a casing, an extension member telescoping in the front end of the tubular housing and having a yoke, a cap on the casing of the front axle having a collar, vertically disposed pivot members connecting the collar with the yoke of the extension member, a shaft extending through the tubular housing and the extension member thereof, said shaft being composed of two members and a universal joint of the sliding type connecting the same, bevel pinions on said shaft meshing with bevel gears of the differential gearings, a motor having a driven shaft extending within the casing of the tubular housing and having a pinion, and a differential gearing on the longitudinal shaft within said casing including a spur wheel meshing with the pinion.

In testimony whereof I affix my signature in presence of two witnesses.

GEORGE A. McGILL.

Witnesses:
M. C. O'Donnell,
B. Booher.